May 20, 1952     E. M. ROSS     2,597,130
COSMETIC CONTAINER
Filed Jan. 2, 1947

Inventor
Ethel M. Ross
By: Norman H. Gerlach
Atty.

Patented May 20, 1952

2,597,130

UNITED STATES PATENT OFFICE 2,597,130

COSMETIC CONTAINER

Ethel M. Ross, Chicago, Ill.

Application January 2, 1947, Serial No. 720,273

1 Claim. (Cl. 132—79)

This invention relates in general to a partitioned cosmetic or make-up container usable as a unit by itself and with a cover or within another receptacle.

An important object of the invention is to provide a cosmetic container which is made of inexpensive material so that it may be thrown away or otherwise disposed of when the container is empty.

Another object of the invention is to provide a container of simple design having cross partitions to form compartments into which separate or different materials may be placed for preventing them from mixing or running together.

A further object of the invention is to provide a cosmetic container as an insert which may be fitted into a permanent plastic, metal, or other material used as a case, throwing away the insert when it is empty or replacing it with a new insert, if desired.

Other objects of the invention will appear in the specification and will be apparent from the accompanying drawings in which, Fig. 1 is a top view of the cosmetic container in accordance with this invention;

Figure 1:
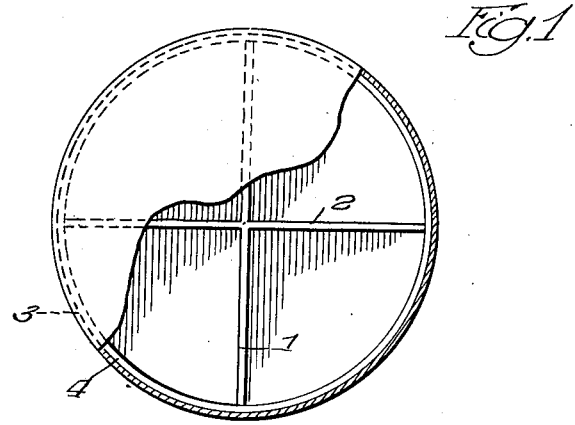
Figure 2:
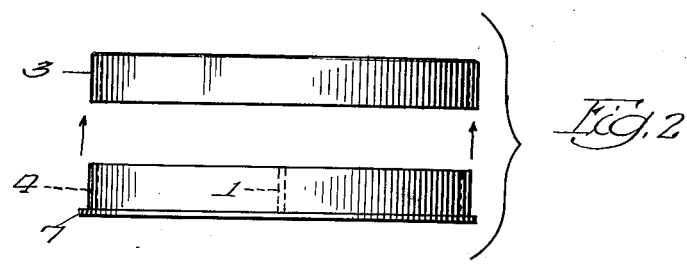
Fig. 2 is a side elevation of a cosmetic container as shown in Fig. 1 with a removable raised lid.
Figures 3, 4:
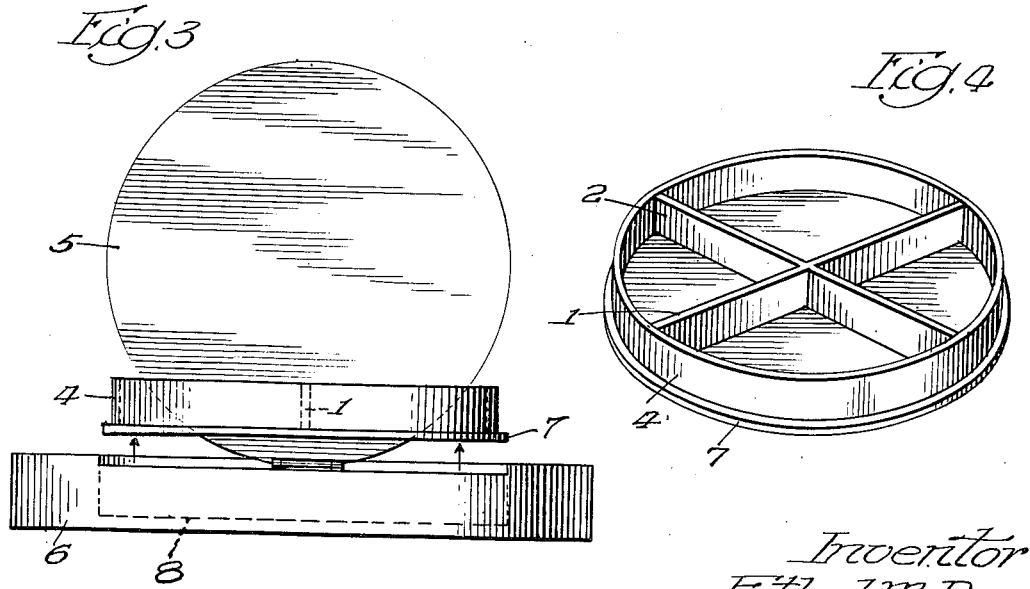
Fig. 3 is a side elevation of a cosmetic container applied as a unit to a conventional ladies' compact, the cosmetic container being raised from the compact and the lid of the compact being opened.
Fig. 4 is a perspective view of the container shown in Fig. 1.

This container is preferably made of light inexpensive material such as plastic so that when empty, it may be thrown away or otherwise disposed of. The container comprises a circular base 7 with an upstanding rim 4 near the edge to provide a lip for receiving a cover 3 which fits flush with the outer edge of the base. Within the container are cross partitions 1 and 2 dividing the container into four quarterly compartments. If six compartments are desired, three similar diametric partitions will be inserted at equal distances apart.

This container is a complete disposable unit without the cover 3 and with the cover 3 it forms a completely closed container.

If desired, the partitioned container base may be inserted in a ladies' compact 6 which has a recess 8, and a hinged lid 5 adapted to be closed over the compact and also adapted to be closed over the cosmetic container when it is inserted within the recess 8.

With this construction, the partitioned container is a complete unit for holding cosmetics such as cleansing cream, face lip rouge, base cream, face powder, etc. With the removable lid 3, the container is complete in itself and needs no other receptacle, and either with the lid or without it, the container unit may be used in connection with a compact or other receptacle.

While a circular container is shown having two intersecting transverse partitions, the number of partitions may be increased, correspondingly diminishing the sizes of the compartments within the container, depending somewhat upon the material to be held therein, and the container may also be square, rectangular, oblong, or various other shapes with as many partitions as desired.

While a preferred construction has thus been shown and described in detail, it should be regarded as an illustration or example and not as a restriction or limitation, as various changes in the construction, combination and arrangement of the parts may be made without departing from the spirit and scope of the invention.

I claim:

As a new article of manufacture, a container adapted temporarily to retain different types of cosmetic materials and comprising a comparatively shallow body consisting of a flat circular bottom wall of uniform thickness throughout, a concentric imperforate cylindrical side wall connected to, and extending upwards from, the bottom wall and of such external diameter that its outer periphery is spaced inwards a small distance from the edge of said bottom wall, and a plurality of straight, upstanding partitions of the same height as the side wall, extending radially from the center of the space within the side wall, having the bottom margins thereof connected to the upper surface of the bottom wall and their outer ends connected to the inner periphery of the side wall, and arranged to define with said bottom wall and side wall a plurality of sector-shaped, open top compartments for said different types of cosmetic materials, and a separately formed completely removable cover consisting of a flat circular top wall having the same diameter as the bottom wall of the body and adapted when the cover is in its closed position with respect to the body to extend across and abut against the upper margins of the partitions and the upper margin of the body side wall in order to seal the compartments and prevent the materials therein from moving from one compartment to another, and an imperforate cylindrical skirt connected to, and depending from, the margin of the top wall and adapted to surround and grip the outer periphery of the body side wall, said skirt being the same in height as the side wall in order that when the cover is in its fully closed position the lower margin of the skirt abuts against the portion of the body bottom wall that is outwards of the body side wall and being of such thickness that when the cover is in place its outer periphery is flush with the edge of the bottom wall of the body.

ETHEL M. ROSS.

REFERENCES CITED

The following references are of record in the file of this patent:

UNITED STATES PATENTS

| Number | Name | Date |
| --- | --- | --- |
| 105,269 | Spencer | July 12, 1870 |
| 908,338 | Sheble et al. | Dec. 29, 1908 |
| 1,601,991 | Albert | Oct. 5, 1926 |
| 1,641,650 | Walker | Sept. 6, 1927 |
| 2,115,930 | Lynn | May 3, 1930 |
| 2,147,510 | Amick | Feb. 14, 1939 |
| 2,215,480 | Sampson | Sept. 24, 1940 |
| 2,445,685 | Miles | July 20, 1948 |